United States Patent
Parlett, Jr. et al.

[11] Patent Number: 5,781,869
[45] Date of Patent: Jul. 14, 1998

[54] VEHICLE REACTION TIMER

[75] Inventors: John K. Parlett, Jr., P.O. Box 126/6820 New Market Turner Rd., Mechanicsville, Md. 30136-6113; Helmut R. Forren, Duluth, Ga.

[73] Assignee: John K. Parlett, Jr., Mechanicsville, Md.

[21] Appl. No.: 790,714

[22] Filed: Jan. 29, 1997

[51] Int. Cl.⁶ .................................. G06F 19/00
[52] U.S. Cl. .................... 701/1; 364/569; 307/10.1; 368/9; 368/10
[58] Field of Search .................. 701/1; 364/569; 307/10.1; 368/9, 10, 107, 110; 377/5, 20; 968/802, 834, 843; 324/162

[56] References Cited

U.S. PATENT DOCUMENTS

| | | | |
|---|---|---|---|
| 3,643,158 | 2/1972 | Kroner et al. | 324/162 |
| 4,456,383 | 6/1984 | Speckhart et al. | 368/9 |
| 4,467,219 | 8/1984 | Reid | 307/10.1 |
| 4,846,467 | 7/1989 | Rosson | 377/5 |
| 5,600,185 | 2/1997 | Hamma et al. | 307/10.1 |

*Primary Examiner*—Gary Chin
*Attorney, Agent, or Firm*—Donald A. Kettlestrings

[57] ABSTRACT

A system for accurately measuring and displaying the elapsed time from the instant a vehicle driver mechanically or electronically acts on a vehicle to start forward motion of the vehicle until the time actual vehicle movement begins. The system includes a timer, a start timer switch for activating the timer when the vehicle is instructed by the driver to begin forward motion and a stop timer switch which stops the timer when the vehicle attains a predetermined forward acceleration.

8 Claims, 3 Drawing Sheets

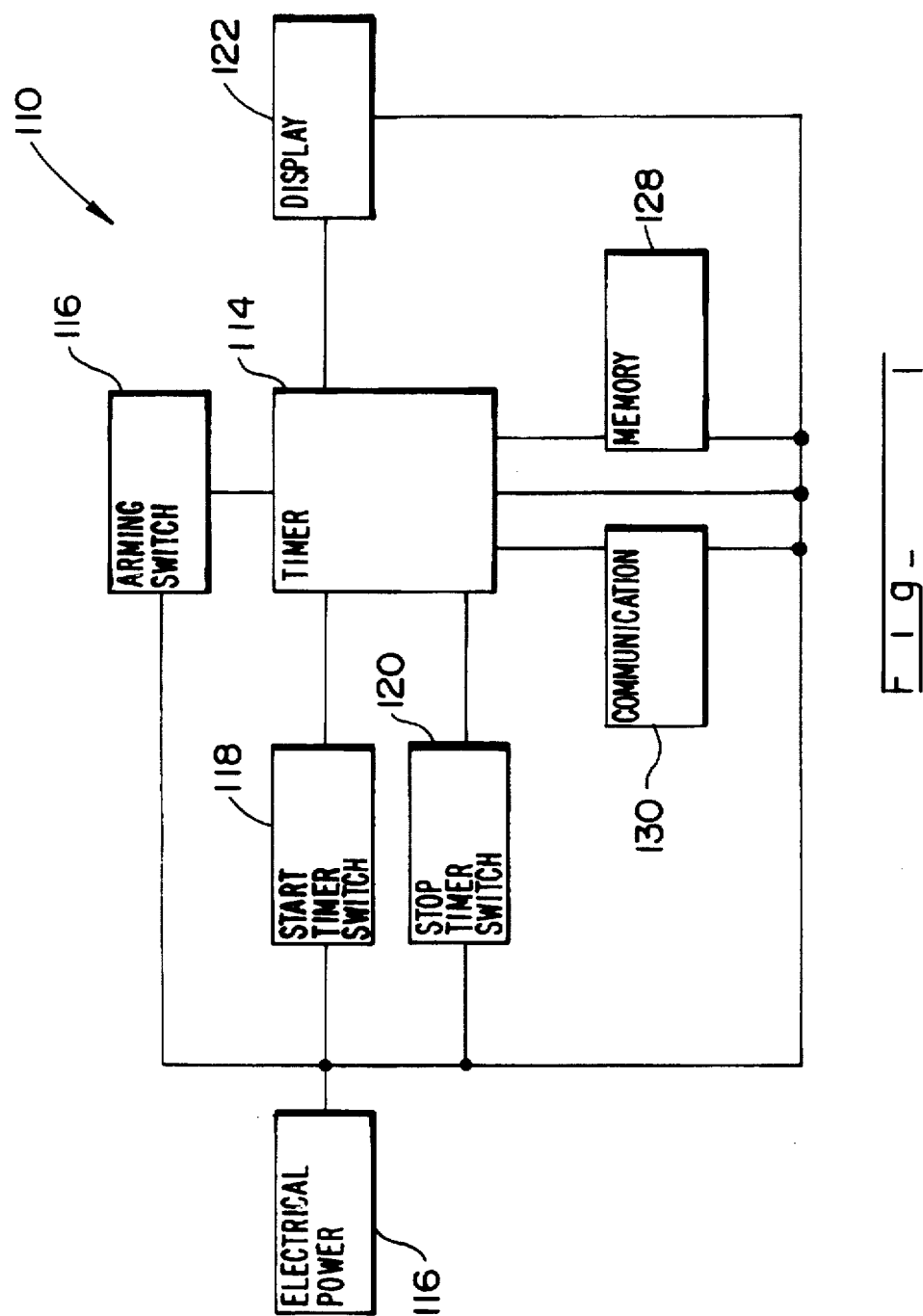

5,781,869

1

VEHICLE REACTION TIMER

BACKGROUND OF THE INVENTION

This invention relates to a timer and more particularly to apparatus for measuring vehicle reaction time.

In the sport of drag racing, as well as other possible instances, it is desirable to very accurately measure the elapsed time from the instant a vehicle is mechanically or electronically acted upon by the driver to start forward motion until the time when actual vehicle movement begins. This period of elapsed time is characterized as "vehicle reaction time".

In the sport of drag racing, the total reaction time of both the driver and the vehicle are typically measured by the existing starting line timers at the race track. This total reaction time is measured from the time the starting line light turns green (indicating that the race has begun) until the vehicle moves out of the starting line electronic beam.

Measuring total reaction time in this manner takes into account the driver's reaction time to the light turning green, differences in vehicle placement on the track in relationship to the electronic beam placement, as well as the inherent delay in the vehicle from the time the driver acts to start the race car moving (by depressing the throttle, releasing the brake, letting out the clutch, etc.) until actual movement of the vehicle past the electronic beam occurs. This method does accurately report the total reaction time, but it does not provide the driver with information that would reliably allow him to know where changes should be made to improve the total reaction time. As an example, the driver wouldn't know if it were his own reaction time (from when the starting line light turns green until he acts on the vehicle to start forward motion of the vehicle) that was slow or inconsistent, or if it were something mechanical within the vehicle that was causing a slow or inconsistent vehicle reaction time.

It is, therefore, an object of the present invention to provide a device which will accurately and repeatably measure the actual vehicle reaction time (VRT).

Another object is to provide a device which will accurately and repeatably measure the time period beginning when the driver acts to start the vehicle moving by means normally utilized to start a vehicle moving during a race and ending when the vehicle actually moves.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects, the present invention provides a system for measuring reaction time of a vehicle wherein the vehicle has a source of electricity, the system comprising: a timer; first means in operative relationship with the timer and with the vehicle source of electricity for providing electricity to the timer; second means in operative relationship with the vehicle, with the timer and with the first means for starting the timer when the vehicle driver acts on the vehicle to start forward motion of the vehicle; third means in operative relationship with the vehicle, with the timer and with the first means for stopping the timer when the vehicle attains a predetermined forward acceleration;

2 and display means in operative relationship with the timer and with the first means for displaying the time elapsed from the starting of the timer to the stopping of the timer.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate a preferred embodiment of the invention and, together with the description, serve to explain the principles of the invention.

FIG. 1 is a block diagram showing the vehicle reaction timer;

DESCRIPTION OF THE PREFERRED EMBODIMENT

Figure 2A:
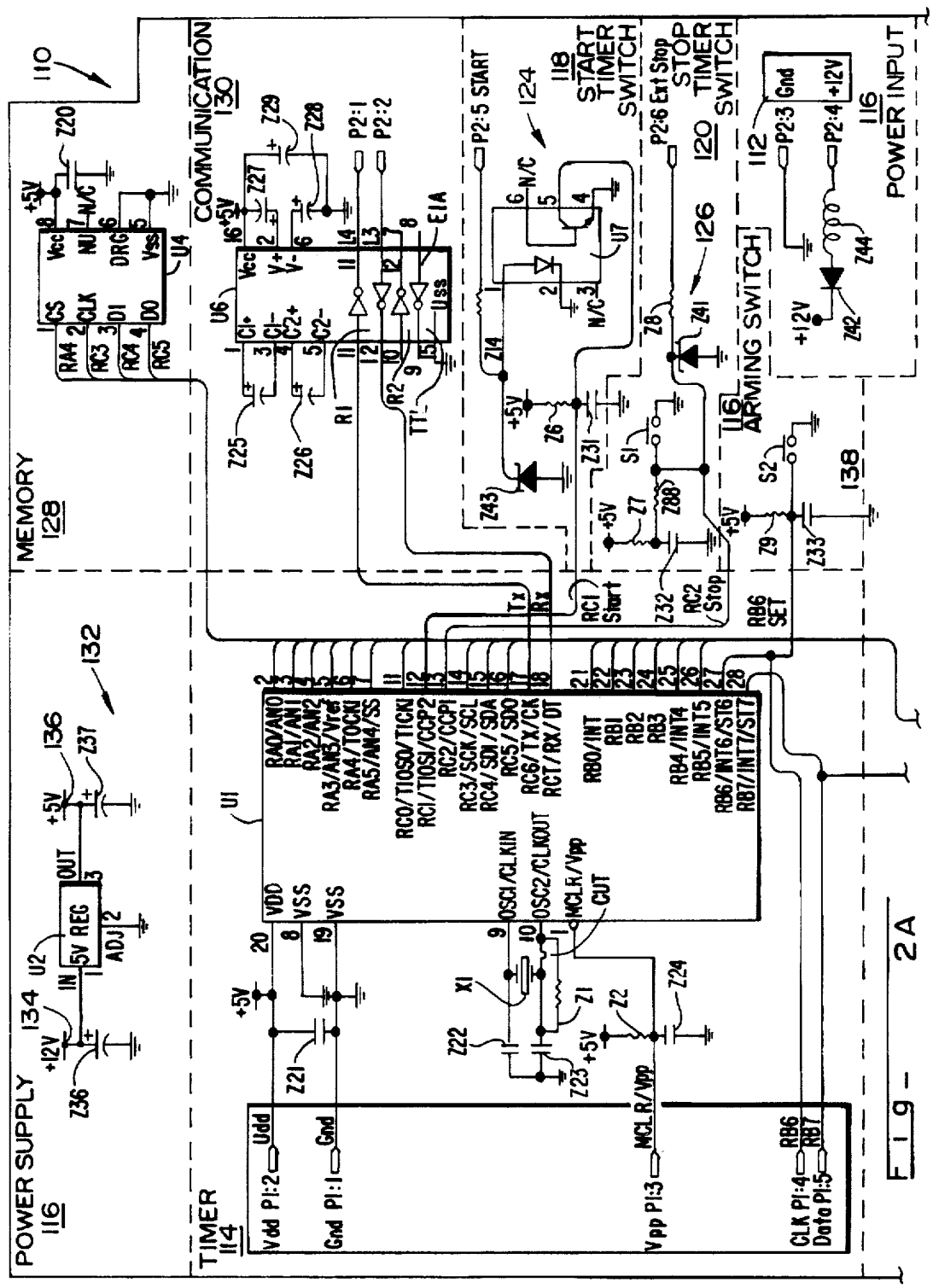
FIG. 2A is a circuit diagram of a portion of the vehicle reaction timer.
Figure 2B:
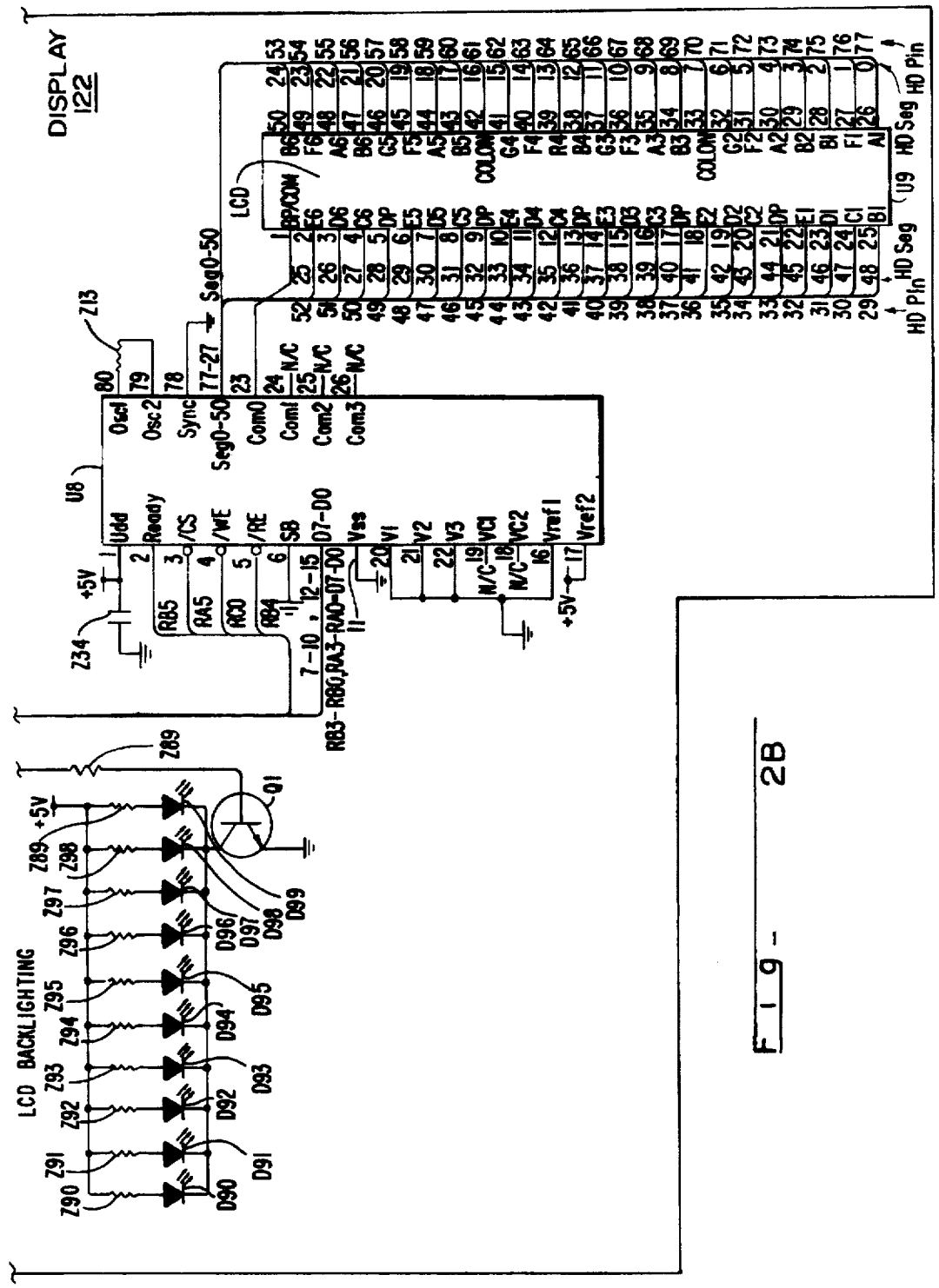
FIG. 2B is a circuit diagram of the remaining portion of the vehicle reaction timer and wherein FIGS. 2A and 2B placed together illustrate the entire vehicle reaction timer circuit.

With reference now to the drawings, wherein like reference characters designate like or corresponding parts throughout the several views, there is shown a system 110 for measuring reaction time of a vehicle (not shown) wherein the vehicle has a source of electricity 112, such as a twelve volt battery.

In accordance with the invention, system 110 comprises a timer 114 and first means 116 in operative relationship with timer 114 and with the vehicle's source of electricity 112 for providing electricity to timer 114.

System 110 further comprises second means 118 in operative relationship with the vehicle, with timer 114 and with first means 116 for starting timer 114 when the vehicle driver acts on the vehicle to start forward motion of the vehicle.

System 110 also includes third means 120 in operative relationship with the vehicle, with timer 114 and with first means 116 for stopping timer 114 when the vehicle attains a predetermined forward acceleration.

System 110 further includes display means 122 in operative relationship with timer 114 and with first means 116 for displaying the time elapsed from the starting of timer 114 to the stopping of timer 114. Display means 122 preferably visually displays the time elapsed from the starting of timer 114 to the stopping of timer 114.

The vehicle has conventional mechanical and/or electrical means (not shown) for initiating forward motion of the vehicle, such as a clutch pedal, a foot brake or line lock system, an accelerator pedal, a transmission brake switch, etc. Second means 118 include first switch means 124 in operative relationship with the conventional vehicle initiating means for activating first switch means 124 and for starting timer 114 when the vehicle driver activates the vehicle initiating means to start foward motion of the vehicle.

In accordance with the invention, third means 120 include second switch means 126 which are activated upon being subjected to a predetermined forward acceleration of the vehicle.

System 110 may further include memory means 128 in operative relationship with timer 114 and with first means 116 for storing reaction times of the vehicle. System 110 may also include communication means 130 in operative relationship with timer 114 and with first means 116 for communicating vehicle reaction times of the vehicle to a printer (not shown) or to a host computer (not shown).

The vehicle's source of electricity is typically twelve volt battery 112, and first means 116 include a power supply with a voltage regulator 132 having an input 134 and an output 136. A diode Z42 and an inductor Z44 are preferably connected in series electrical circuit with each other and between voltage regulator input 134 and a positive terminal of battery 112.

In accordance with the invention, second means 118 preferably include an optoisolator U7 connected in electrical circuit relationship with the negative terminal of battery 112 and in operative relationship with the vehicle to be removed from the positive terminal of battery 112 and activated when the vehicle driver acts on the vehicle to start forward motion of the vehicle.

First means 116 include an arming switch 138 that will reset timer 114 to zero. Arming switch 138 may be remotely located or an integral part of timer 114.

Activation of first switch means 124 starts the timing process; and switch means 124 may be located in a number of locations depending upon how forward motion of the vehicle is normally started. Examples would include: (a) a switch located under the clutch pedal (not shown) so that when the clutch is released timer 114 would start; (b) a switch interconnected with the foot brake (not shown) or line lock system (not shown) of the vehicle so that when the brakes of the vehicle are released timer 114 will start; (c) a switch located under the accelerator pedal (not shown) of the vehicle that would start timer 114 when the vehicle accelerator is depressed; (d) a connection to the existing vehicle transmission brake switch (not shown) so that when the vehicle transmission brake is released timer 114 would start; (e) any other switching function or mechanical motion that will activate switch means 124 to start timer 114 when the vehicle driver acts on the vehicle to start forward motion of the vehicle at the beginning of the race.

Timer 114 may be mechanical or electronic but an electronic timer is preferred. Timer 114 may be a stand alone timer for the sole purpose of use in system 110, or timer 114 may be incorporated as an add-on or integral part of a data acquisition system. Excellent repeatability and high accuracy are important for timer 114, and its unit of measure must be in increments of a minimum of 0.001 second for drag racing purposes. It is, however, possible that other applications may not require this degree of accuracy.

Third means or stop timer switch 120 is a switch that will repeatably stop timer 114 when the vehicle begins forward movement. Second switch means 126 of stop timer switch 120 may be of many different configurations, such as an inertia switch, a G-meter, a pendulum switch, etc. Switch 126 should be of a design that will stop timer 114 when the vehicle attains a predetermined forward acceleration.

Following is a detailed description of the circuitry for the preferred embodiment of system 110. The circuitry consists of ten primary sections as follows:

1. Wiring Harness
2. Power Supply
3. Power Input
4. Timer
5. Display
6. Memory
7. Communication
8. Start Timer Switch
9. Stop Timer Switch
10. Arming Switch

Wiring Harness

The wiring harness, not illustrated, serves to connect timer 114 to the vehicle. The wiring harness features wires for connecting to the positive and negative terminals of the vehicle's twelve volt battery 112 at P2:4 and P2:3, plus two wires for the external start (P2:5) and optional external stop (P2:6) switches. Normally stop switch 120 is internal to the timer package. The active state of start switch 118 is for the switch to be removed from the positive terminal of battery 112. The active state of stop switch 120 is for the switch to connect its input to the vehicle chassis ground, which is in common with the negative terminal of battery 112.

Optionally, the wiring harness may also include two wires P2:1 and P2:2 for bi-directional communication with a printer (not shown) or host computer (not shown).

Typically, start switch wire P2:5 is controlled by a feature of the vehicle that also controls forward motion of the vehicle. The purpose of start switch 118 is to start timer 114 whenever the vehicle is "instructed" by the driver to begin forward motion. Possible switches (not shown) for particular installations include:

a) a switch located under the clutch pedal,
b) a switch interconnected with the foot brake or line lock system,
c) a switch located under the accelerator pedal,
d) a connection to the existing transmission brake switch,
e) as well as any other switching function or mechanical motion switch.

Typically, stop switch 120 includes a motion switch S1 that performs a contact closure upon being subjected to an accelerative force. This may be an inertia switch, a G-meter, a pendulum switch, a tilt switch, or any other switch that reacts to motion of the vehicle, including but not limited to "electric eye" switches. In the preferred embodiment, switch S1 is mounted internal to the timer package. Optionally, an external stop switch (not shown) may be used via the appropriate wiring harness wire P2:6. When the external stop switch wire P2:6 is used, it may be connected to a switch similar to the internal one. Alternatively, stop switch wire P2:6 may be connected to another signal (not shown) on the vehicle. In this case, the meaning of the time between activation of start and stop switches 118, 120 may be different from the normal vehicle reaction time.

Power Supply

The power supply consists of a five volt voltage regulator U2. Capacitor Z36 is connected to the regulator's input 134 and serves to filter out power supply noise, to provide voltage smoothing on the input to the regulator, and to provide reserve energy as the electrical load of the voltage regulator changes. Capacitor Z37 is connected to the regulator's output 136 and serves similar functions as capacitor Z36.

Power Input

Power input circuit 117 is a part of the power supply, but appears in a different place on the circuit diagram for convenience purposes.

Diode Z42 serves as protection against reverse polarized application of power. Inductor Z44 provides additional noise filtering above and beyond capacitor Z36. Inductor Z44 is specifically included to filter out surges in the automotive voltage system as a result of engagement and disengagement of the transmission brake solenoid (not shown). Without inductor Z44, surges generated by the transmission brake solenoid may cause unpredictable microprocessor (timer) behavior.

Timer

The core of timer 114 is microprocessor U1. The microprocessor takes the inputs, performs the appropriate timing functions, and then displays the results. The actual behavior of the microprocessor in this embodiment is described hereinafter under the heading "Microprocessor Program".

Support for microprocessor U1 includes capacitor Z21, which serves to filter noise out of the power supply and to prevent injection of noise into the power supply by the switching occurring inside the processor. Resistor Z1, capacitors Z22, Z23 and 4 MHz crystal X1 serve as an accurate time base for the microprocessor. Resistor Z2 and capacitor Z24 serve as a power-up input to the microprocessor, causing it to initialize itself properly.

Display

Display 122 informs the user of the most recently recorded reaction time. The display is composed of three major subsections: the LCD display glass itself U9, an LCD controller chip U8 and LED backlighting for the glass.

The LCD display glass U9 is a typical direct drive type LCD having six digits composed of seven segments each, plus assorted decimal points and colons. Each display segment has a dedicated pin on one end of the segment, and is connected to a common backplane pin on the other end of the segment. LCD controller chip U8 drives the backplane pin with a square wave voltage, which magnitude (approximately five volts) is controlled by its contrast control pins. Pins 20, 21 and 22 are all grounded for highest contrast. The LCD controller chip likewise drives each of the individual segment pins. If a segment pin is driven with a voltage identical to that of the backplane pin, then the net voltage across the corresponding segment will always equal zero and so the segment will be off (invisible). Alternatively, if a segment pin is driven with a signal of opposite phase from the backplane pin, then the net voltage across the corresponding segment will be an AC signal of approximately five volts peak-to-peak and the segment will be on (visible).

Capacitor Z34 serves as power supply noise filtering for the controller. Resistor Z13 is used by the controller's internal oscillator circuit. This circuit oscillates at approximately 60 Hz and controls the timing of the drive signals for the individual LCD segments.

The LCD backlighting consists of a number of LEDs (D90-D99) mounted behind the LCD glass and around its periphery, illuminating a light-diffusing material that is directly under the glass. The current through each LED is limited by a resistor (Z90-Z99). The backlight may be turned on or off by microprocessor U1 through its control of transistor Q1 and current limiting resistor Z89.

Memory

An optional memory 128 having chip U4 may be included with system 110. The preferred embodiment includes an optional three-wire interface EEPROM. This memory will retain information indefinitely after power has been removed from the circuit. Microprocessor U1 may store previous reaction times or other information in this memory and confidently expect them to still be there later in time, after a possible intervening loss of power. Capacitor Z20 helps filter noise from the power supply.

Communication

An optional communication 130 having chip U6 may be included with system 110. This communication chip allows microprocessor U1 to print results to a printer (not shown) or download them to a host computer (not shown). Capacitors Z25-Z29 are used by the chip to generate industry standard communications voltages.

Start Timer Switch

The start timer switch input P2:5 is typically connected to a transmission brake solenoid (not shown). The circuit features an optical isolator U7 designed to prevent surges from the transmission brake solenoid from damaging or falsely triggering timer 114. Resistor Z14 and Zener diode Z43 serve as additional input protection, while resistor Z6 and capacitor Z31 provide filtering against very quick, erroneous triggers. Whenever start switch input P2:5 is removed from vehicle battery 112 power, current will cease flowing through protection resistor Z14 and optical isolator U7 diode to ground P2:3. In response, current will cease flowing through pullup resistor Z6 and U7 output transistor, causing a rise in voltage seen by timer 114 on its start input.

Stop Timer Switch

Stop timer switch 126 is normally an internal G-switch S1. This switch performs a contact closure upon application of G (acceleration) forces in excess of, for example, 0.8 G. Resistor Z7 and capacitor Z32 help filter against very quick, erroneous triggers. Resistor Z88 limits current discharging from Z32 through S1, thus reducing generated noise.

The internal G-switch may be removed and an external switch used instead via wire P2:6. In this case, resistor Z8 and Zener diode Z41 prevent the voltage applied to microprocessor U1 from going outside of the safe range from 1 volt to 5.6 volts. Protection up to approximately 50 volts, plus or minus, is achieved with this circuit.

Arming Switch

Arming switch 138 is preferably "Set Button" S2, which is an internal switch made from a rubber button with a conductive puck. When the button is depressed, the conductive puck shorts together two conductors on the PC board. Since the resistance of this short may be as high as 10K ohms, special attention is paid to the values of the filtering components, resistor Z9 and capacitor Z33. These components filter out very quick, erroneous contacts of the button. Button debouncing is further performed by microprocessor U1.

Microprocessor Program

Following is a pseudo-code microprocessor program for the implementation of system 110. This program is designed for a PIC16C73A microprocessor with a 4 MHZ crystal, resulting in a 1 microsecond timer interval.

In general, interrupt tasks are responsible for counting time, recognizing the first Start input, and recognizing the first Stop input. The net result of these interrupt tasks are the OVERFLOW, START and STOP variables. The foreground task continuously translates these variables and displays an appropriate indication on the LCD display. Note that at power up, the foreground task also initializes the system and effects a Reset. The operator must cycle the power off and back on to accomplish subsequent Resets.

Major Variables

These are the major variables used in the program. Other minor support variables may be used as well.

COUNT: Internal 16 bit counter, automatically incremented every 1 microsecond

HICOUNT: 8 bit counter incremented each COUNT overflow Note: 24 bits result from concatenating HICOUNT:COUNT OVERFLOW: Set to 1 if HICOUNT overflows after approximately 8.38 seconds START: 24 bit HICOUNT:COUNT when start input first active (0 not a valid value)

STOP: 24 bit HICOUNT:COUNT when stop input first active (0 not a valid value)

ELAPSE: HICOUNT:COUNT-START

REACT: STOP-START

Foreground Task (Begins at Power Up)

The foreground task initializes the processor, initializes the LCD display module, and intitializes all variables. It then enables interrupts and goes into a tight display loop. For each iteration of the loop, it displays on the LCD display one of four items: either the word "RESET", the word "OVERFLOW" if the 24 bit HICOUNT:COUNT counter has overflowed, the elapsed time if START has been set but not STOP, and the reaction time if both START and STOP have been set. Whenever time is displayed, the 24 bit count of 1 microsecond intervals is converted to seconds and milliseconds, with any lower order time value being discarded.

```
(Start program)
(Initialize ports and interrupts)
COUNT = 0
HICOUNT = 0
OVERFLOW = 0
START = 0
STOP = 0
(Enable interrupts)
LOOP LABEL:
    IF START == 0
        (Display RESET indication on LCD display "_____")
    ELSE IF OVERFLOW == 1
        (Display OVERFLOW on LCD display "888888")
    ELSE IF STOP == 0
        ELAPSE = HICOUNT:COUNT-START
        (Calculate elapsed seconds and milliseconds from
            ELAPSE)
        (Display elapsed time on LCD display as seconds and
            milliseconds)
    ELSE
        REACT = START-STOP
        (Calculate reaction time seconds and milliseconds
            from REACT)
        (Display valid reaction time on LCD display)
    ENDIF
JUMP TO LOOP LABEL
    HICOUNT Interrupt Task (occurs when 16 bit COUNT overflows)
```

The microprocessor's internal 16 bit counter, called COUNT in this pseudo-code, is automatically incremented every 1 microsecond. As such, it will overflow 65.536 ms. The microprocessor may be configured to generate an interrupt when this overflow occurs. This interrupt routine then increments an 8 bit counter HICOUNT in order to synthesize a 24 bit counter result. Since reaction times are expected to be less than 16.7 seconds, no provision is made for counting beyond this interval. If the 8 bit counter HICOUNT overflows, a flag variable OVERFLOW is set so that an erroneous time is not displayed on the LCD display.

```
(Interrupts automatically disabled)
IF HICOUNT < 255
    HICOUNT = HICOUNT + 1
ELSE
    OVERFLOW = 1
ENDIF
(Return from interrupt, interrupts automatically enabled)
    Start Interrupt Task
    (occurs when Start input becomes active)
```

The microprocessor is configured to automatically perform two functions whenever the Start input becomes active. It will make a copy of the fast-running internal counter COUNT. This copy is the one referred to below as "COUNT (as of interrupt)." It will then generate an interrupt that may be processed several 1 microsecond counts later. This interrupt routine checks to see if START has already been set by a previous Start input. If it has not (if it's still zero), then START is assigned the 24 bit result of concatenating the 8 bit HICOUNT overflow counter with the internal 16 bit COUNT.

Since a race condition may exist where this interrupt task occurs just after an internal timer interrupt yet just before the HICOUNT interrupt task is invoked, it may be necessary to adjust the value of START by adding 65536 to compensate for the increment of HICOUNT that should have occurred before this interrupt. The situation prevails whenever a counter overflow interrupt is pending (as indicated by processor status registers) and the COUNT (as of interrupt) is less than 32768 (and most likely very close to zero), indicating that a freshly overflowed COUNT was saved as COUNT (as of interrupt) and an adjustment is warranted due to the fact that HICOUNT has not yet been incremented. If instead the COUNT (as of interrupt) is larger than 32768 (and most likely very close to 65536), then the saved COUNT (as of interrupt) occurred just before the overflow of COUNT and thus no adjustment is warranted. Of course, if no overflow interrupt is pending, no adjustment is warranted either.

```
(Interrupts automatically disabled)
IF START == 0
    START = HICOUNT:COUNT (as of interrupt)
    (Consider adjusting START if HICOUNT interrupt pending)
ENDIF
(Return from interrupt, interrupts automatically enabled)
    Stop Interrupt Task
    (occurs when Stop input becomes active)
```

The stop interrupt task behaves exactly like the start interrupt task, except that it responds independently to the Stop input rather than the Start input. It is also subject to adjustments in STOP whenever a timer overflow interrupt is pending.

```
(Interrupts automatically disabled)
IF STOP == 0
    STOP = HICOUNT:COUNT (as of interrupt)
    (Consider adjusting STOP if HICOUNT interrupt pending)
```

-continued

ENDIF
(Return from interrupt, interrupts automatically enabled)

| Parts List | |
|---|---|
| Wiring Harness | |
| P2 | 4 conductor cable selectively inserted into 4 of 6 holes (P2:1 through P2:6) on PC board. |
| Power Supply | |
| U2 | Linear Technologies 5 volt regulator (Digikey P/N LT 1121CST-5-ND) |
| Z36 | 6.8 uF electrolytic capacitor, 25 volt rating (Digikey P/N PCE1006CT-ND) |
| Z37 | 6.8 uF electrolytic capacitor, 25 volt rating (Digikey P/N PCE1006CT-ND) |
| Power Input | |
| Z44 | 100 uH inductor (Digikey P/N DN10104CT-ND) |
| Z42 | Diode (Digikey P/N DL4935CT-ND) |
| Timer (and display connector) | |
| U1 | Processor (Microchip P/N PIC16C73-04/SO) |
| X1 | 4 MHZ crystal (Digikey P/N SE3438-ND) |
| Z1 | Optional resistor (value TBD) |
| Z2 | 150 K resistor (Digikey P/N P150KECT-ND) |
| Z21 | 100 nF capacitor (Digikey P/N PCC104BCT-ND) |
| Z22 | 33 pF capacitor (Digikey P/N PCC330CTR-ND) |
| Z23 | 33 pF capacitor (Digikey P/N PCC330CTR-ND) |
| Z24 | 100 nF capacitor (Digikey P/N PCC104BCT-ND) |
| Display | |
| U8 | LCD controller chip (Hitachi P/N HD61604) |
| U9 | LCD display glass with DIL pins (Standish P/N 3918-365-920) |
| Z34 | 100 nF capacitor (Digikey P/N PCC104BCT-ND) |
| Z89 | 1.1 K resistor (Digikey P/N P1.1KECT-ND) |
| Z90–Z99 | 51 ohm resistor (Digikey P/N P51ECT-ND) |
| D90–D99 | Lumex SSB-LNX02GC side-emitting LED (Digikey P/N LU20435-ND) |
| Q1 | 2N3904 transistor (Digikey P/N 2N3904-ND) |
| Memory | |
| U4 | 1 k bit serial EEPROM (Microchip P/N 93LC46), alternatively 2 k bit and 4 k bit (Microchip P/N 93LC56 and 93LC66 respectively) |
| Z20 | 100 nF capacitor (Digikey P/N PCC104BCT-ND) |
| Communication | |
| U6 | Maxim RS-232 chip (Digikey P/N MAX232CWE-ND) |
| Z25–Z29 | 1 uF electrolytic capacitor, 50 volt rating (Digikey P/N PCE1016CT-ND) |
| Start Timer Switch | |
| U7 | Quality Tech Optoisolator (Digikey P/N 2N26QT-ND) |
| Z6 | 15 K resistor (Digikey P/N P15KECT-ND) |

-continued

| Parts List | |
|---|---|
| Z31 | 0.001 uF Capacitor (Digikey P/N PCC102BCT-ND) |
| Z43 | 30 V (27 V) Zener Diode (Digikey P/N BZT52-C27DICT-ND) |
| Stop Timer Switch | |
| S1 | Motion switch (5th Dimension P/N 21638, contact closes at 0.8 G acceleration) |
| Z7 | 15 K resistor (Digikey P/N P15KECT-ND) |
| Z8–Z88 | 1.1 K resistor (Digikey P/N P1.1KECT-ND) |
| Z32 | 0.001 uF Capacitor (Digikey P/N PCC102BCT-ND) |
| Z41 | 30 V (27 V) Zener Diode (Digikey P/N BZT52-C27DICT-ND) |
| Arming Switch | |
| S2 | Conductive rubber button (Advanced Rubber Concepts P/N GL-006) |
| Z9 | 150 K resistor (Digikey P/N P150KECT-ND) |
| Z33 | 0.001 uF Capacitor (Digikey P/N PCC102BCT-ND) |

In operation and use, the vehicle driver activates arming switch 138 which resets timer 114 to zero. The driver then engages whatever means are normally used to hold the vehicle ready to start the race. This will activate start timer switch 118 which will signal timer 114 as to when the driver acts on the vehicle to start the vehicle in motion. When the driver actually instructs the vehicle to begin forward motion, start timer switch 124 will start timer 114 running. When the vehicle actually starts moving forward, the inertia switch, G-meter, pendulum switch, etc. S1 in stop timer switch 120 stops timer 114. The actual vehicle reaction time is then read from timer 114 by visual display 122 or by other electronic means.

The elapsed time displayed by display 122 as derived from timer 114 is the actual vehicle reaction time (VRT). The VRT is exclusive of the driver's personal reaction time, and can provide the racer with valuable information. Having the VRT for each race allows for the comparison of the VRT from race to race to determine many things including:

1. Vehicle reaction time consistency or the lack thereof.
2. Impact of changes made to engine launch rpm.
3. Impact of changes made to chassis and suspension components.
4. Impact of changes in clutch/torque converter set-up.
5. Impact of changes in engine tune-up or set-up.
6. Impact of changes made with different tire compounds.
7. Impact of changes made in tire pressure settings.
8. Impact of changes in transmission and/or differential gear ratios.
9. Impact of differences in transmission brakes and valve bodies.
10. Impact of changes in fuel delivery system.
11. Impact of virtually any item that affects vehicle reaction time.

The invention in its broader aspects is not limited to the specific details shown and described, and departures may be made from such details without departing from the principles of the invention and without sacrificing its chief advantages.

What is claimed is:

1. A system for measuring reaction time of a vehicle wherein the vehicle has a source of electricity, said system comprising:
   a timer;
   first means in operative relationship with said timer and with said vehicle's source of electricity for providing electricity to said timer;
   second means in operative relationship with said vehicle, with said timer and with said first means for starting said timer when the vehicle driver acts on said vehicle to start forward motion of said vehicle;
   third means in operative relationship with said vehicle, with said timer and with said first means for stopping said timer when said vehicle attains a predetermined forward acceleration; and
   display means in operative relationship with said timer and with said first means for displaying the time elapsed from said starting of said timer to said stopping of said timer.

2. A system as in claim 1 wherein said display means visually displays the time elapsed from said starting of said timer to said stopping of said timer.

3. A system as in claim 1 wherein said vehicle has means for initiating forward motion of said vehicle and wherein said second means include first switch means in operative relationship with said initiating means for activating said first switch means and for starting said timer when the vehicle driver activates said vehicle initiating means.

4. A system as in claim 3 wherein said third means include second switch means activated upon being subjected to said predetermined forward acceleration of said vehicle.

5. A system as in claim 4 further including memory means in operative relationship with said timer and with said first means for storing reaction times of said vehicle.

6. A system as in claim 4 further including communication means in operative relationship with said timer and with said first means for communicating vehicle reaction times of said vehicle to a printer or to a host computer.

7. A system as in claim 1 wherein said vehicle's source of electricity includes a battery and wherein said first means include:
   a voltage regulator having an input and an output; and
   a diode and an inductor connected in series electrical circuit with each other and between said voltage regulator input and a positive terminal of said battery.

8. A system as in claim 7 wherein said second means include:
   an optoisolator connected in electrical circuit relationship with said battery and said timer and in operative relationship with said vehicle for preventing damage to and false triggering of said timer.

* * * * *